US007441260B1

(12) United States Patent
Kurapati

(10) Patent No.: US 7,441,260 B1
(45) Date of Patent: Oct. 21, 2008

(54) TELEVISION PROGRAM RECOMMENDER WITH AUTOMATIC IDENTIFICATION OF CHANGING VIEWER PREFERENCES

(75) Inventor: Kaushal Kurapati, Yorktown Heights, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1628 days.

(21) Appl. No.: 09/666,630

(22) Filed: Sep. 20, 2000

(51) Int. Cl.
H04N 9/00 (2006.01)
H04N 5/445 (2006.01)

(52) U.S. Cl. .............................. 725/46; 725/9; 725/14; 725/44

(58) Field of Classification Search ............. 725/44–46, 725/9, 14, 38
See application file for complete search history.

(56) References Cited

U.S. PATENT DOCUMENTS

| | | | | |
|---|---|---|---|---|
| 5,410,344 | A | * | 4/1995 | Graves et al. .................. 725/46 |
| 5,541,638 | A | * | 7/1996 | Story ......................... 725/116 |
| 5,734,444 | A | * | 3/1998 | Yoshinobu .................... 725/14 |
| 5,758,259 | A | * | 5/1998 | Lawler ........................ 725/45 |
| 5,798,785 | A | * | 8/1998 | Hendricks et al. ............. 725/46 |
| 5,801,747 | A | * | 9/1998 | Bedard ........................ 725/46 |
| 5,867,226 | A | | 2/1999 | Wehmeyer et al. .......... 348/563 |
| 6,005,597 | A | * | 12/1999 | Barrett et al. ................. 725/46 |
| 6,088,722 | A | * | 7/2000 | Herz et al. ................... 709/217 |
| 6,438,752 | B1 | * | 8/2002 | McClard ...................... 725/46 |
| 6,490,724 | B1 | * | 12/2002 | Ha et al. ........................ 725/9 |
| 2003/0093792 | A1 | * | 5/2003 | Labeeb et al. ................. 725/46 |

FOREIGN PATENT DOCUMENTS

GB 2343075 A 4/2000
WO WO9907142 2/1999

OTHER PUBLICATIONS

Ehrmantraut et al.: "The Personal Electronic Program Guide—Towards The Pre-Selection Of Individual TV Programs," Proceedings Of The Inernational Conference On Information And Knowledge Management CIKM, ACM, New York, NY, US, Dec. 11, 1996, pp. 243-250.

* cited by examiner

Primary Examiner—Hunter B. Lonsberry

(57) ABSTRACT

A television program recommender is disclosed that automatically identifies changes in viewing preferences. Once changing viewing preferences are identified, the disclosed television programming recommender can (i) adapt the generated television program recommendations to such changes in viewing preferences, or (ii) more efficiently manage the storage of the viewing history. For cyclical or periodic changes in viewing preferences, the television programming recommender generates television program recommendations using a sub-set of the viewing history from a corresponding earlier time period. Likewise, for true or permanent changes in viewing preferences, the television programming recommender optionally generates television program recommendations using the most recent sub-set of the viewing history, which most likely reflects the current viewing preferences. In a further variation, program recommendations can be generated using a combination, such as the union or intersection, of recommendations based on viewing histories from two different periods of time. The television programming recommender can confirm that viewing preferences have not changed significantly over time, and thereafter delete portions of the viewing history without loss of any performance in the generated recommendations.

32 Claims, 4 Drawing Sheets

PROGRAM DATABASE 300

| DATE/TIME 340 | CHANNEL 345 | TITLE 350 | GENRE 355 | ... | RECOMMENDER SCORE 370 |
|---|---|---|---|---|---|
| 11/18/99 -- 8:00 P.M. | CH1 | LUCY | COMEDY | | 55 |
| 11/18/99 -- 8:30 P.M. | CH1 | AL'S FAMILY | SITCOM | | 78 |
| ... | | | | | |
| 11/18/99 -- 9:00 P.M. | CH3 | YOUR HOUSE | DRAMA | | 96 |

TELEVISION PROGRAM RECOMMENDER WITH AUTOMATIC IDENTIFICATION OF CHANGING VIEWER PREFERENCES

FIELD OF THE INVENTION

The present invention relates to television program recommenders, and more particularly, to a method and apparatus for generating television program recommendations.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Such tools for generating television program recommendations provide selections of programs that a viewer might like, based on their prior viewing history. While such television program recommenders help a user to identify television programs of interest, they suffer from a number of limitations, which if overcome, could greatly improve the performance in the generated recommendations. For example, with such conventional tools for generating television program recommendations, changes in the television viewing habits of a viewer, often referred to as "non-stationary viewing preferences," are not easily identified. Furthermore, conventional tools for generating television program recommendations consider a person's viewing history as a whole when generating a viewer profile and television program recommendation scores.

In addition, with such conventional tools for generating television program recommendations, it is hard to identify portions of a user's viewing history that can be deleted. Thus, unnecessary portions of the user's viewing history are often maintained longer than necessary and some desired portions could be prematurely deleted. Generally, if viewing preferences do not change much over time, older viewing histories can be deleted without loss of any performance in the generated recommendations. There is currently no way, however, to determine if the viewer's preferences have changed.

A need therefore exists for methods and apparatus for generating television program recommendations that identify changing viewer preferences. A further need therefore exists for methods and apparatus for generating television program recommendations that adapt television program recommendations to changing viewer preferences.

SUMMARY OF THE INVENTION

Generally, a method and apparatus are disclosed for generating television program recommendations based on the prior viewing history of a viewer. According to one aspect of the invention, changes in the viewing preferences are automatically identified. Furthermore, once changing viewing preferences are identified, the disclosed television programming recommender (i) adapts the generated television program recommendations to such changes in viewing preferences, or (ii) more efficiently manages the storage of the viewing history.

For cyclical or periodic changes in viewing preferences, such as repetitive changes corresponding to the time of day or time of year, the television programming recommender generates television program recommendations using a sub-set of the viewing history from a corresponding earlier time period. Likewise, for true or permanent changes in viewing preferences, the television programming recommender optionally generates television program recommendations using the most recent sub-set of the viewing history, which most likely reflects the current viewing preferences. In another variation, program recommendations can be generated using a combination, such as the union or intersection, of recommendations based on two different periods of time.

According to another aspect of the invention, the disclosed television programming recommender identifies portions of a user's viewing history that can be deleted without loss of information. The television programming recommender confirms that viewing preferences have not changed significantly over time, and thereafter deletes older portions of the viewing history without loss of any performance in the generated recommendations.

Generally, the present invention establishes at least two sub-sets, $VH_1$ and $VH_K$, from the available viewing history of a user. The disclosed television programming recommender generates viewer profiles, $P_1$ and $P_K$, corresponding to each viewing history sub-set, respectively. Thereafter, the television programming recommender utilizes the viewer profiles, $P_1$ and $P_K$, to generate a corresponding set of program recommendation scores for the programs in a given time interval.

The top-N (where N is a positive integer) recommended television programs, $S_1$ and $S_K$, are evaluated. If the two sets of programs, $S_1$ and $S_K$, are identical, then the viewer's preferences have not changed significantly. Thus, the oldest portions of the viewing history can be discarded without loss of information. If, however, the two sets of top-N programs, $S_1$ and $S_K$, are different, then the television programming recommender has identified a non-stationary viewer preference. In the event that a change in viewing preferences is detected, the television programming recommender can present the user with one or both sets of programs, $S_1$ and $S_K$, or a combination of the two sets, such as a union or intersecting set.

A more complete understanding of the present invention, as well as further features and advantages of the present invention, will be obtained by reference to the following detailed description and drawings.

BRIEF DESCRIPTION OF THE DRAWINGS

FIG. 3 is a sample table from the program database of FIG. 1; and

DETAILED DESCRIPTION

Figure 1:
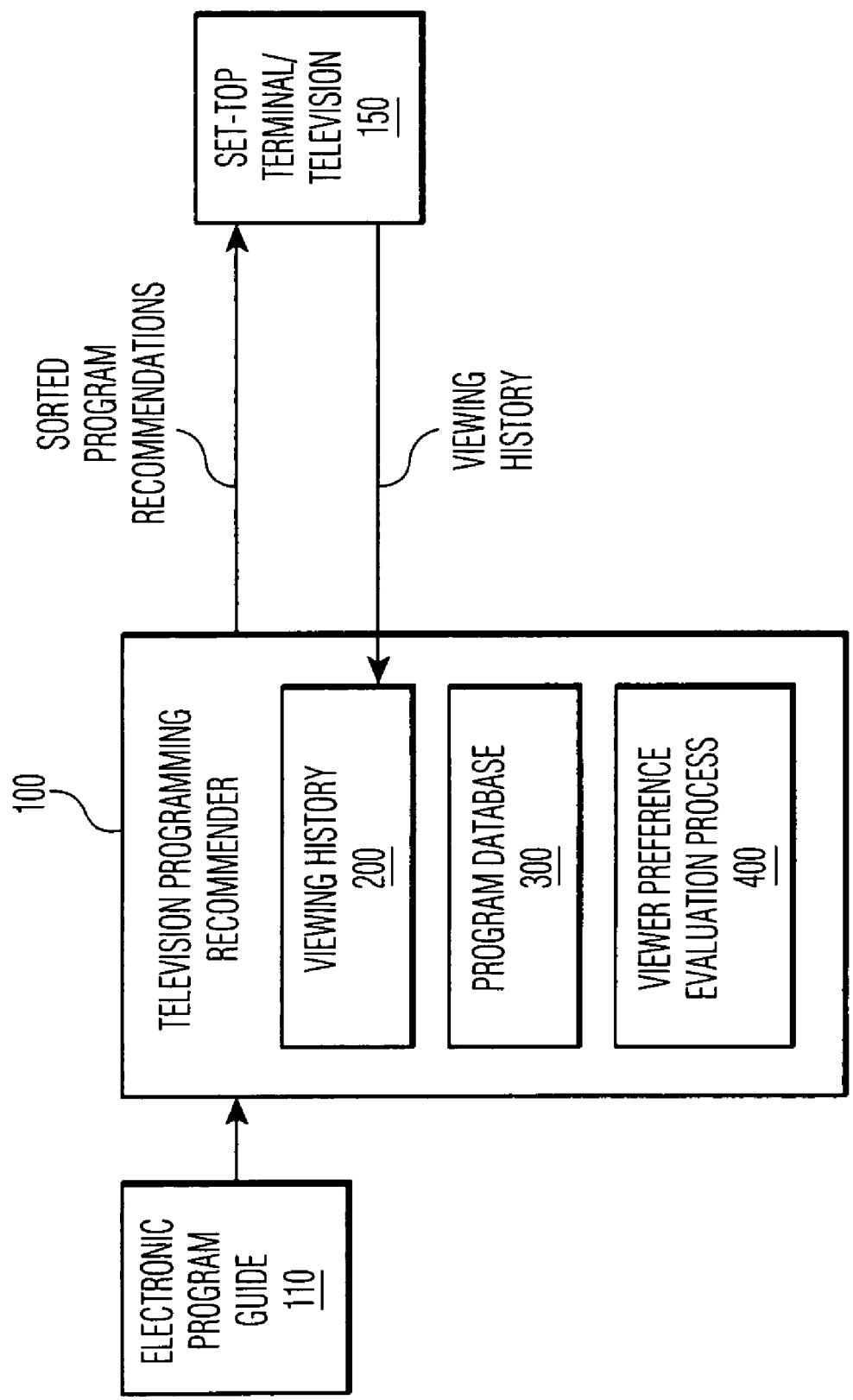
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular user. The set of recommended programs can be presented to the user using a set-top terminal/television 150, for example, using well known on-screen presentation techniques. The television programming recommender 100 identifies programs that a viewer might like, based on their prior viewing history 200, discussed further below in conjunction with FIG. 2.

According to one feature of the present invention, discussed further below in conjunction with FIG. 2, the television programming recommender 100 considers sub-sets of the entire viewing history 200 when generating television program recommendations. Thus, the entire viewing history 200 is analyzed in parts and multiple viewing profiles are generated for a single person. For each sub-set of the viewing history 200, the television programming recommender 100 generates a corresponding user profile that can be utilized to generate television program recommendation scores. In one embodiment, each sub-set of the viewing history 200 is selected by either (i) uniformly randomly sampling sub-sets of television programs from the entire viewing history 200, or (ii) selecting a time span that is less than the entire time period covered by the viewing history 200.

In this manner, the television programming recommender 100 can identify non-stationary viewer preferences. Furthermore, once changing viewing preferences are identified, the television programming recommender 100 can (i) adapt the generated television program recommendations to such changes in viewing preferences, and (ii) more efficiently manage the storage of the viewing history 200. For cyclical or periodic changes in viewing preferences, such as repetitive changes corresponding to the time of day or time of year, the television programming recommender 100 generates television program recommendations using a sub-set of the viewing history 200 from a corresponding earlier time period. Likewise, for true or permanent changes in viewing preferences, the television programming recommender 100 generates television program recommendations using the most recent sub-set of the viewing history 200, which most likely reflects the current viewing preferences.

For example, the viewing habits of many viewers may change temporarily during the fall season with the start of a new television season, or during the playoffs of a given sport. Likewise, the viewing habits of a given viewer may be different in the morning hours as compared to the evening hours. Thus, the performance of the television programming recommender 100 can improve if the portion of the viewing history 200 that is used to generate the program recommendations more closely resembles the time period of interest. In other words, if a viewer changed his or her viewing preferences, the programs corresponding to the new preferences would appear in the most recent viewing history.

According to another feature of the present invention, the television programming recommender 100 identifies portions of a user's viewing history that can be deleted. The television programming recommender 100 of the present invention can confirm that viewing preferences have not changed significantly over time, and thereby delete older portions of the viewing history without loss of any performance in the generated recommendations.

As shown in FIG. 1, the television programming recommender 100 contains a viewing history 200, discussed further below in conjunction with FIG. 2, a program database 300, discussed further below in conjunction with FIG. 3, and a viewer preference evaluation process 400, discussed further below in conjunction with FIG. 4. Generally, the viewing history 200 contains the set of shows that was watched (and/or not watched) by the viewer over a period of time. The program database 300 records information for each program that is available in a given time interval. The viewer preference evaluation process 400 generates recommendation scores for each program in a particular time interval, taking into account non-stationary viewing preferences in accordance with the present invention, and displays the program together with an indication of the recommendation score assigned to each program by the television programming recommender 100.

The television program recommender 100 may be embodied as any computing device, such as a personal computer or workstation. In addition, the television programming recommender 100 may be embodied as any available television program recommender, such as the Tivo™ system, commercially available from Tivo, Inc., of Sunnyvale, Calif., or the television program recommenders described in U.S. patent application Ser. No. 09/466,406, filed Dec. 17, 1999, entitled "Method and Apparatus for Recommending Television Programming Using Decision Trees," and U.S. patent application Ser. No. 09/498,271, filed Feb. 4, 2000, entitled "Bayesian TV Show Recommender," or any combination thereof, as modified herein to carry out the features and functions of the present invention.

Figure 2:
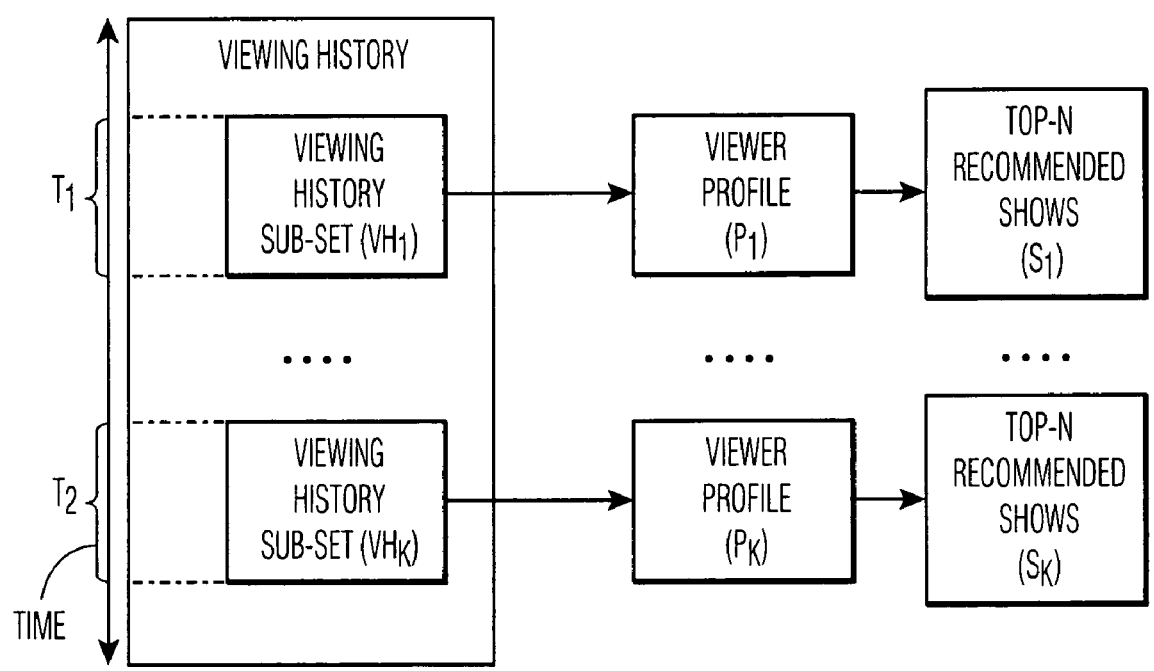
FIG. 2 illustrates the processing of a viewing history in accordance with the present invention.

FIG. 2 illustrates the processing of the viewing history 200 in accordance with the present invention. As shown in FIG. 2, at least two sub-sets, $VH_1$ and $VH_K$, are established from the viewing history 200. The viewing history sub-sets, $VH_1$ and $VH_K$, correspond to the sets of shows watched by the viewer during time spans $T_1$ and $T_2$, respectively. In the example shown in FIG. 2, time spans $T_1$ and $T_2$ are non-overlapping. The time spans $T_1$ and $T_2$ could easily be overlapping, however, as would be apparent to a person of ordinary skill in the art. Furthermore, one or both time spans $T_1$ and $T_2$ can be discontinuous, and need not be of equal duration. The illustrative viewing history sub-sets, $VH_1$ and $VH_K$, correspond to the time spans that are less than the entire time period covered by the viewing history 200. If a viewer changed his or her viewing preferences from time span $T_1$ to time span $T_2$, the programs corresponding to the new preferences would appear in time span $T_2$.

As shown in FIG. 2, and discussed further below in conjunction with FIG. 4, the television programming recommender 100 in accordance with the present invention generates a viewer profile, $P_1$ and $P_K$, corresponding to each time span, respectively. Thereafter, the television programming recommender 100 utilizes the viewer profiles, $P_1$ and $P_K$, to generate a corresponding set of program recommendation scores for the programs in a given time interval.

The television programming recommender 100 then processes the corresponding top-N (where N is a positive integer) sets of recommender programs, $S_1$ and $S_K$. If the two sets of programs, $S_1$ and $S_K$, are identical, then the viewer's preferences have not changed, or at least have not changed enough so that the television programming recommender 100 can perceive the difference. Thus, the oldest portions of the viewing history 200 ($VH_1$ in the present example) can be discarded.

If, however, the two sets of programs, $S_1$ and $S_K$, are different, with some number of programs in common, then the television programming recommender 100 has identified the common thread. Finally, if the two sets of programs, $S_1$ and $S_K$, are different, with no programs in common, then the viewer's preferences have changed completely between the two selected time periods. In the event that a change in viewing preferences is detected, the television programming recommender 100 can present one or both sets of programs, $S_1$ and $S_K$, or a combination of the two sets, such as a union or intersecting set.

FIG. 3 is a sample table from the program database 300 of FIG. 1 that records information for each program that is available in a given time interval. As shown in FIG. 3, the program database 300 contains a plurality of records, such as records 305 through 320, each associated with a given program. For each program, the program database 300 indicates the date/time and channel associated with the program in fields 340 and 345, respectively. In addition, the title and genre for each program are identified in fields 350 and 355. Additional well-known attributes (not shown), such as actors, duration, and description of the program, can also be included in the program database 300.

In accordance with one feature of the present invention, the program database 300 also records an indication of the recommendation score assigned to each program by the television programming recommender 100 in field 370. In this manner, the numerical scores can be displayed to the user in the electronic program guide with each program directly or mapped onto a color spectrum or another visual cue that permits the user to quickly locate programs of interest.

Figure 4:
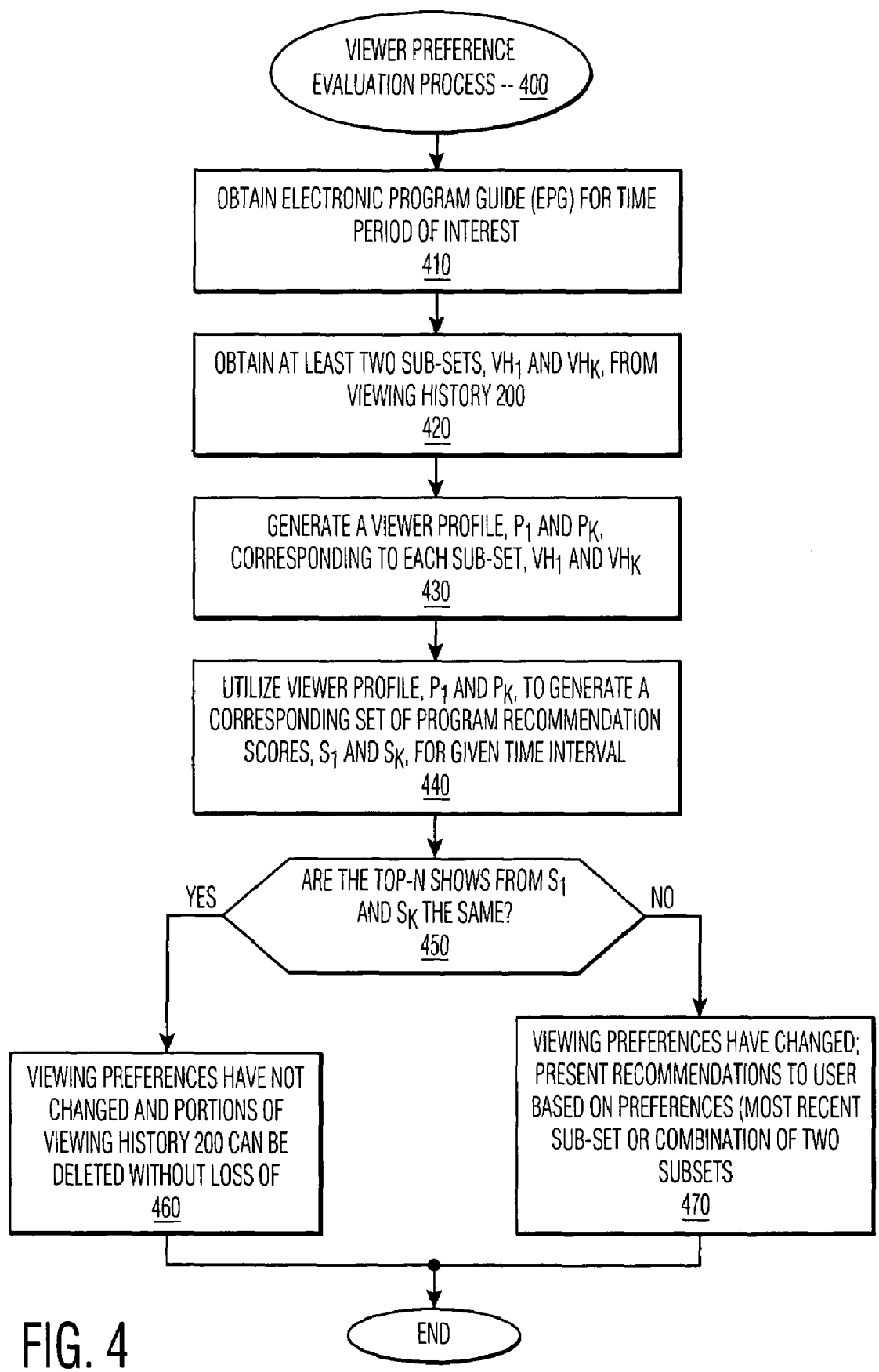
FIG. 4 is a flow chart describing an exemplary viewer preference evaluation process embodying principles of the present invention.

FIG. 4 is a flow chart describing an exemplary viewer preference evaluation process 400 embodying principles of the present invention. As shown in FIG. 4, the viewer preference evaluation process 400 initially obtains the electronic program guide (EPG) 110 during step 410 for the time period of interest. Thereafter, the viewer preference evaluation process 400 obtains at least two sub-sets, $VH_1$ and $VH_K$, from the viewing history 200 during step 420 and generates a viewer profile, $P_1$ and $P_K$, corresponding to each sub-set, $VH_1$ and $VH_K$ during step 430.

The viewer profiles, $P_1$ and $P_K$, are utilized during step 440 to generate a corresponding set of program recommendation scores, $S_1$ and $S_K$, for the programs identified in the EPG 110 for a given time interval. A test is performed during step 450 to determine if the top-N shows from $S_1$ and $S_K$ are the same. If it is determined during step 450 that the top-N shows from $S_1$ and $S_K$ are the same, then the viewing preferences have not changed significantly over time, and a portion of the viewing history 200 can be deleted during step 460 without loss of information.

If, however, it is determined during step 450 that the top-N shows from $S_1$ and $S_K$ are not the same, then the viewing preferences have changed significantly over time, and the recommendations should be presented to user during step 470 based, for example, on used-defined preferences. For example, the user can specify that detected changes in viewing preferences are likely permanent and that the most recent sub-set, $VH_K$, of the viewing history 200 should always be used to generate recommendations. Alternatively, the user can specify that detected changes in viewing preferences are likely temporary and that some combination of the two sub-sets, $VH_1$ and $VH_K$, of the viewing history 200, such as a union or intersection of the two sub-sets, should be used to generate recommendations. In addition, the user can specify that detected changes in viewing preferences are likely cyclical in nature and that a sub-set, $VH_K$, from a corresponding (similar) earlier time period should be used to generate recommendations.

It is to be understood that the embodiments and variations shown and described herein are merely illustrative of the principles of this invention and that various modifications may be implemented by those skilled in the art without departing from the scope and spirit of the invention.

What is claimed is:

1. A method for identifying changes in television viewing preferences of an individual, comprising the steps of:
   obtaining a viewing history indicating a set of programs that have been watched by a user;
   establishing at least two viewing history sub-sets, $VH_1$ and $VH_K$, from said viewing history;
   generating a corresponding set of program recommendation scores, $S_1$ and $S_K$, for a set of programs in a given time interval based on said at least two viewing history sub-sets, $VH_1$ and $VH_K$; and
   comparing said sets of program recommendation scores, $S_1$ and $S_K$ based on respective viewing history sub-sets, to identify a change in said viewing preferences.

2. The method of claim 1, wherein said comparing step further comprises the step of comparing the top-N (where N is a positive integer) recommended television programs in each sets, $S_1$ and $S_K$.

3. The method of claim 1, further comprising the step of generating viewer profiles, $P_1$ and $P_K$, corresponding to said at least two viewing history sub-sets, $VH_1$ and $VH_K$.

4. The method of claim 1, further comprising the step of presenting a user with a set of recommended programs based on one or both of said sets of programs, $S_1$ and $S_K$.

5. The method of claim 1, further comprising the step of presenting a user with a union set of recommended programs based on said sets of programs $S_1$ and $S_K$.

6. The method of claim 1, further comprising the step of presenting a user with an intersection set of recommended programs based on said sets of programs, $S_1$ and $S_K$.

7. The method of claim 1, further comprising the step of presenting a user with a set of recommended programs, $S_K$, based on a more recent sub-set of said viewing history.

8. The method of claim 1, wherein said at least two viewing history sub-sets, $VH_1$ and $VH_K$, from said viewing history are obtained by uniformly randomly sampling sub-sets of television programs from said viewing history.

9. The method of claim 1, wherein said at least two viewing history sub-sets, $VH_1$ and $VH_K$, from said viewing history are obtained by selecting a time span that is less than the entire time period covered by the viewing history.

10. The method of claim 9, wherein said selected time span is an earlier similar time period to a given time interval.

11. A method for managing the storage of a viewer history in a television program recommender, comprising the steps of:
   obtaining a viewing history indicating a set of programs that have been watched by a user;
   establishing at least two viewing history sub-sets, $VH_1$ and $VH_K$, from said viewing history;
   generating viewer profiles, $P_1$ and $P_K$, corresponding to said at least two sub-sets, $VH_1$ and $VH_K$;
   generating a corresponding set of program recommendation scores, $S_1$ and $S_K$, for a set of programs in a given time interval based on said viewer profiles, $P_1$ and $P_K$;
   comparing said sets of program recommendation scores, $S_1$ and $S_K$, to identify a change in viewing preferences; and
   deleting a portion of said viewing history if said sets of program recommendation scores, $S_1$ and $S_K$ are substantially similar.

12. The method of claim 11, wherein said comparing step further comprises the step of comparing the top-N (where N is a positive integer) recommended television programs in each set, $S_1$ and $S_K$.

13. The method of claim 11, wherein said at least two viewing history sub-sets, $VH_1$ and $VH_K$, from said viewing history are obtained by uniformly randomly sampling sub-sets of television programs from said viewing history.

14. The method of claim 11, wherein said at least two viewing history sub-sets, $VH_1$ and $VH_K$, from said viewing history are obtained by selecting a time span that is less than the entire time period covered by the viewing history.

15. The method of claim 14, wherein said selected time span is an earlier similar time period to a given time interval.

16. A system for identifying changes in television viewing preferences of an individual, comprising:
   a memory for storing computer readable code; and
   a processor operatively coupled to said memory, said processor configured to:
   obtain a viewing history indicating a set of programs that have been watched by a user;
   establish at least two viewing history sub-sets, $VH_1$ and $VH_K$; from said viewing history;
   generate a corresponding set of program recommendation scores, $S_1$ and $S_K$, for a set of programs in a given time interval based on said at least two viewing history sub-sets, $VH_1$ and $VH_K$; and
   compare said sets of program recommendation scores, $S_1$ and $S_K$ based on respective viewing history sub-sets, to identify a change in said viewing preferences.

17. The system of claim 16, wherein said processor compares the top-N (where N is a positive integer) recommended television programs in each set, $S_1$ and $S_K$.

18. The system of claim 16, wherein said processor is further configured to generate viewer profiles, $P_1$ and $P_K$, corresponding to said at least two viewing history sub-sets, $VH_1$ and $VH_k$.

19. The system of claim 16, wherein said processor is further configured to present a user with a set of recommended programs based on one or both of said sets of programs, $S_1$ and $S_K$.

20. The system of claim 16, wherein said processor is further configured to present a user with a union set of recommended programs based on said sets of programs, $S_1$ and $S_K$.

21. The system of claim 16, wherein said processor is further configured to present a user with an intersection set of recommended programs based on said sets of programs, $S_1$ and $S_K$.

22. The system of claim 16, wherein said processor is further configured to present a user with a set of recommended programs, $S_K$, based on a more recent sub-set of said viewing history.

23. The system of claim 16, wherein said at least two viewing history sub-sets, $VH_1$ and $VH_K$, from said viewing history are obtained by uniformly randomly sampling sub-sets of television programs from said viewing history.

24. The system of claim 16, wherein said at least two viewing history sub-sets, $VH_1$ and $VH_K$, from said viewing history are obtained by selecting a time span that is less than the entire time period covered by the viewing history.

25. The system of claim 24, wherein said selected time span is an earlier similar time period to a given time interval.

26. A system for managing the storage of a viewer history in a television program recommender, comprising:
   a memory for storing computer readable code; and
   a processor operatively coupled to said memory, said processor configured to:
   obtain a viewing history indicating a set of programs that have been watched by a user;
   establish at least two viewing history sub-sets, $VH_1$ and $VH_K$, from said viewing history;
   generate viewer profiles, $P_1$ and $P_K$, corresponding to said at least two viewing history sub-sets, $VH_1$ and $VH_K$;
   generate a corresponding set of program recommendation scores, $S_1$ and $S_K$, for a set of programs in a given time interval based on said viewer profiles, $P_1$ and $P_K$;
   compare said sets of program recommendation scores, $S_1$ and $S_K$, to identify a change in viewing preferences; and
   delete a portion of said viewing history if said sets of program recommendation scores, $S_1$ and $S_K$ are substantially similar.

27. The system of claim 26, wherein said processor compares the top-N (where N is a positive integer) recommended television programs in each set, $S_1$ and $S_K$.

28. The system of claim 26, wherein said at least two viewing history sub-sets, $VH_1$ and $VH_K$, from said viewing history are obtained by uniformly randomly sampling sub-sets of television programs from said viewing history.

29. The system of claim 26, wherein said at least two viewing history sub-sets, $VH_1$ and $VH_K$, from said viewing history are obtained by selecting a time span that is less than the entire time period covered by the viewing history.

30. The system of claim 29, wherein said selected time span is an earlier similar time period to a given time interval.

31. An article of manufacture for identifying changes in television viewing preferences of an individual, comprising:
   a computer readable medium having computer readable code means embodied thereon, said computer readable program code means comprising:
   a step to obtain a viewing history indicating a set of programs that have been watched by a user;
   a step to establish at least two viewing history sub-sets, $VH_1$ and $VH_K$, from said viewing history;
   a step to generate a corresponding set of program recommendation scores, $S_1$ and $S_K$, for a set of programs in a given time interval based on said at least two viewing history portions sub-sets, $VH_1$ and $VH_K$; and
   a step to compare said sets of program recommendation scores, $S_1$ and $S_K$ based on respective viewing history sub-sets, to identify a change in said viewing preferences.

32. An article of manufacture for managing the storage of a viewer history in a television program recommender, comprising:

a computer readable medium having computer readable code means embodied thereon, said computer readable program code means comprising:

a step to obtain a viewing history indicating a set of programs that have been watched by a user;

a step to establish at least two portions viewing history sub-sets, $VH_1$ and $VH_K$, from said viewing history;

a step to generate viewer profiles, $P_1$ and $P_K$, corresponding to said at least two portions viewing history sub-sets, $VH_1$ and $VH_K$;

a step to generate a corresponding set of program recommendation scores, $S_1$ and $S_K$, for a set of programs in a given time interval based on said viewer profiles, $P_1$ and $P_K$;

a step to compare said sets of program recommendation scores, $S_1$ and $S_K$, to identify a change in viewing preferences; and a step to delete a portion of said viewing history if said sets of program recommendation scores, $S_1$ and $S_K$ are substantially similar.

* * * * *